F. M. RAY.
Car Spring.
No. 6,231.
3 Sheets—Sheet 1.
Patented Mar. 27, 1849.
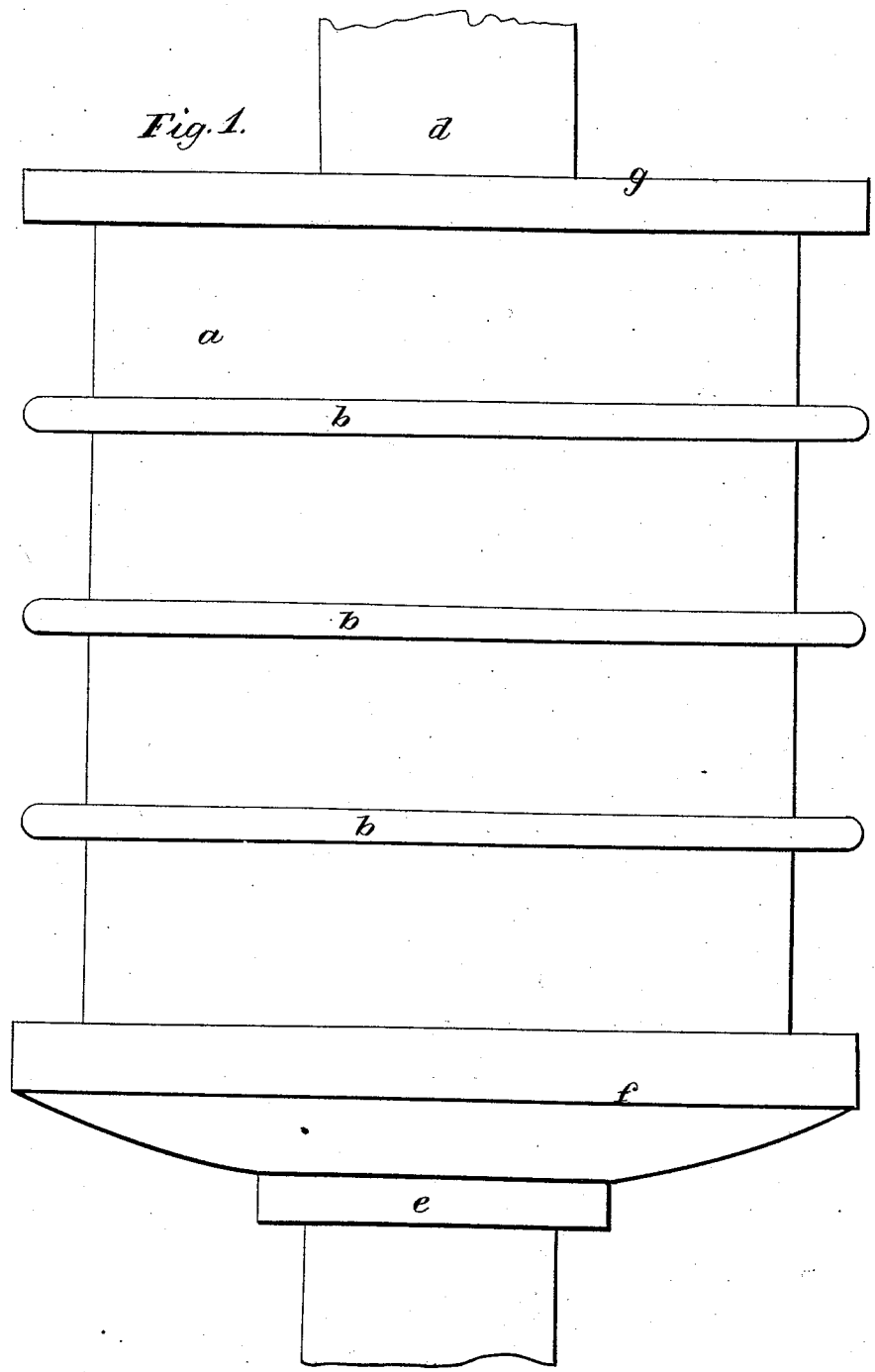

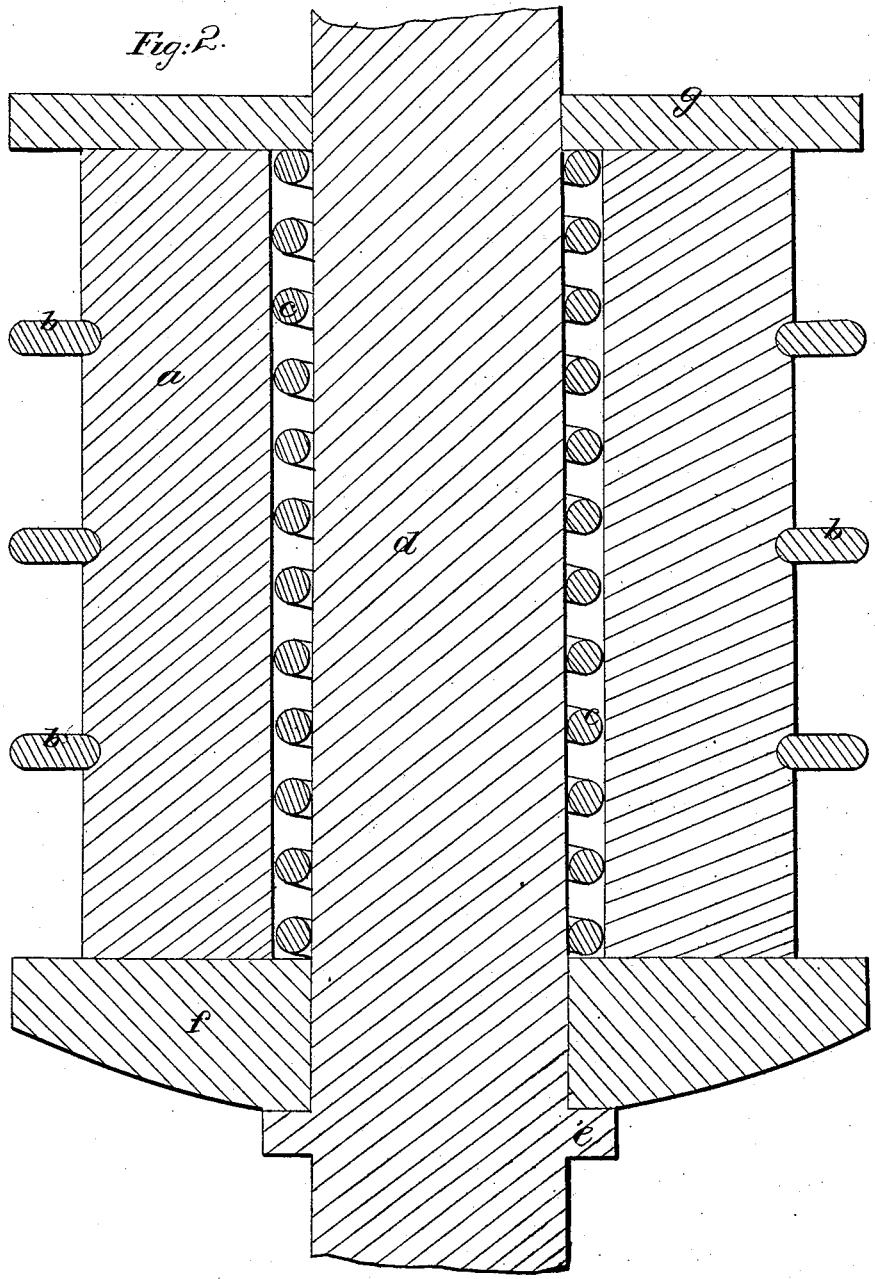

F. M. RAY.
Car Spring.
3 Sheets—Sheet 3.
No. 6,231.
Patented Mar. 27, 1849.
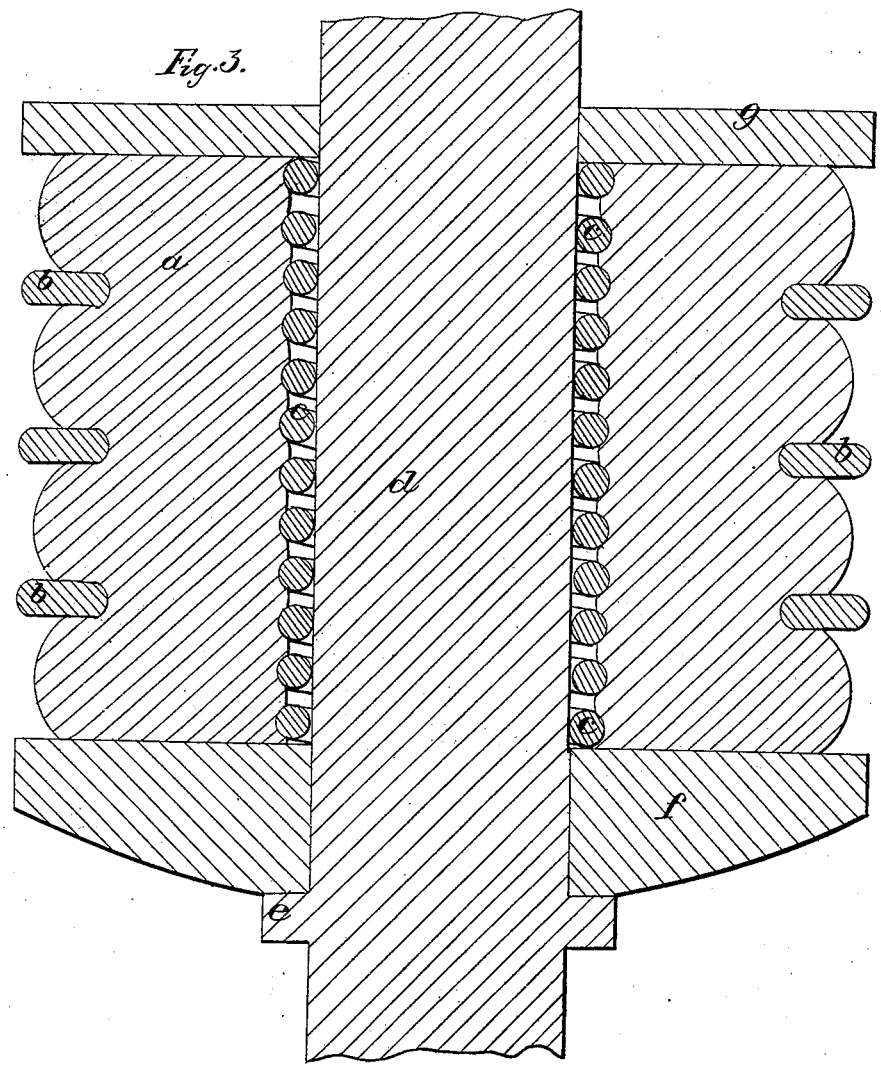

UNITED STATES PATENT OFFICE.

FOWLER M. RAY, OF NEW YORK, N. Y.

CAOUTCHOUC SPRING.

Specification of Letters Patent No. 6,231, dated March 27, 1849.

*To all whom it may concern:*

Be it known that I, FOWLER M. RAY, of the city, county, and State of New York, have invented certain new and useful Improvements in Springs for Railroad-Cars and other Purposes, that the following is a full, clear, and exact description of the principle or character which distinguishes them from all other things before known and of the manner of making, constructing, and using the same, reference being had to the accompanying drawings, making part of this specification, in which—

Figure 1 is a view of a spring on my improved plan; Fig. 2 a vertical section thereof in a non-compressed state; and Fig. 3, a like section thereof in a compressed state.

The same letters indicate like parts in all the figures.

The nature of my invention consists in combining with spring made of metallic rubber and in the bore thereof a helical spring made of metal, and thus combining the elasticity of the metal with that of the rubber, while at the same time the metal spring which contracts longitudinally in the same proportion as the india rubber, prevents the rubber from chafing on the guide rod, that passes through it, and prevents the rubber from expanding laterally in the bore and against the guide rod.

In the accompanying drawings (*a*) represents a cylinder made of what is known as "Goodyear's metallic rubber," sometimes "Goodyear's vulcanized rubber." The outer periphery thereof is surrounded at given distances with metallic rings (*b*), to prevent the rubber from spreading out too much under the effects of the pressure and within the hollow or bore of the said cylinder is inserted a helical spring (*c*) made of steel, or other appropriate metal, and within this is inserted a guide metal rod (*d*), provided with a flanch (*e*), on which rests a disk (*f*), and on this disk is placed one end of the india rubber cylinder, and helical spring, and then onto the other end of these, and over the guide rod, is placed another metal disk (*g*), onto which the load is to be placed.

It will be seen from the foregoing that when pressure is applied, the india rubber and the helical spring within it contract together, thus affording a resistance to the compression by reason of their tension, and that these two will contract together and thus cause the helical spring to resist the lateral expansion of the india rubber toward the guide rod, and as they contract and expand together the helical spring not only prevents the rubber from chafing against the guide rod, but will also greatly add to the tension of the india rubber by preventing its lateral spread. Springs thus made may be applied to sustain the bodies of rail road cars on the trucks or as bumpers on draft springs, or to other purposes. But to whatever purpose applied the connections at the ends must be adapted to each particular purpose, and as this makes no part of the present invention, it is not deemed necessary to give a description of the modification required for all the varieties of application.

What I claim as my invention and desire to secure by Letters Patent, is—

The combination of helical springs made of metal, with, and placed within hollow springs made of metallic or vulcanized india rubber, or any equivalent preparation of rubber, substantially as described, whereby the rubber is prevented from spreading laterally and from chafing against the guide rod, and the tension of the rubber is increased by that of the helical spring—as described.

F. M. RAY.

Witnesses:
E. P. McCREA,
A. P. BROWNE.